United States Patent
Kawase

(10) Patent No.: US 12,463,574 B2
(45) Date of Patent: Nov. 4, 2025

(54) TRANSFER SYSTEM

(71) Applicant: Mitsubishi Electric Corporation, Tokyo (JP)

(72) Inventor: Tatsuya Kawase, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/879,812

(22) PCT Filed: Aug. 4, 2022

(86) PCT No.: PCT/JP2022/029983
§ 371 (c)(1),
(2) Date: Dec. 30, 2024

(87) PCT Pub. No.: WO2024/029047
PCT Pub. Date: Feb. 8, 2024

(65) Prior Publication Data
US 2025/0167711 A1    May 22, 2025

(51) Int. Cl.
| | | |
|---|---|---|
| *B65G 23/23* | (2006.01) | |
| *B65G 54/02* | (2006.01) | |
| *H01L 21/68* | (2006.01) | |
| *H02P 5/00* | (2016.01) | |
| *H02P 25/064* | (2016.01) | |

(52) U.S. Cl.
CPC ............ *H02P 25/064* (2016.02); *B65G 23/23* (2013.01)

(58) Field of Classification Search
CPC .......... H02P 5/00; H02P 25/064; H01L 21/68; B65G 23/23; B65G 54/02
USPC ............................................... 198/463.2, 619
See application file for complete search history.

(56) References Cited

U.S. PATENT DOCUMENTS

| | | | |
|---|---|---|---|
| 10,164,555 B1 | 12/2018 | Ozimek | |
| 10,978,969 B2 | 4/2021 | Weber et al. | |
| 11,190,086 B2* | 11/2021 | Grosskreuz | B65G 54/02 |
| 11,831,182 B1* | 11/2023 | Huang | H02J 50/10 |
| 12,208,975 B2* | 1/2025 | Kawase | H02P 27/06 |

(Continued)

FOREIGN PATENT DOCUMENTS

| | | |
|---|---|---|
| DE | 112022005158 T5 | 8/2024 |
| JP | H08-070565 A | 3/1996 |

(Continued)

OTHER PUBLICATIONS

US 2007/0290637 A1, Sepe, Dec. 20, 2007.*

(Continued)

*Primary Examiner* — Douglas A Hess
(74) *Attorney, Agent, or Firm* — XSENSUS LLP

(57) ABSTRACT

A transfer system includes a plurality of transfer path units that forms a transfer path, on which a transferring body moves, and causes the transferring body to move by giving power to the transferring body. Each of the plurality of the transfer path units includes: a drive unit that generates the power; and an inverter circuit that includes a switching element and supplies, to the drive unit, electric power obtained through electric power conversion by switching of the switching element. In a portion of the transfer path where the transferring body is absent, at least one of one or two or more of the transfer path units in the portion stops the switching.

18 Claims, 8 Drawing Sheets

(56) References Cited

U.S. PATENT DOCUMENTS

| | | |
|---|---|---|
| 2014/0097783 A1 | 4/2014 | Hara |
| 2017/0054400 A1 | 2/2017 | Kumazawa et al. |
| 2021/0135558 A1 | 5/2021 | Kim |

FOREIGN PATENT DOCUMENTS

| | | |
|---|---|---|
| JP | H09-074616 A | 3/1997 |
| JP | H09-208051 A | 8/1997 |
| JP | 2017-042029 A | 2/2017 |
| JP | 2019-221131 A | 12/2019 |
| JP | 2021-078348 A | 5/2021 |
| WO | 2020/217272 A1 | 10/2020 |

OTHER PUBLICATIONS

US 2014/0097783 A1, Hara, Apr. 10, 2014.*
US 2023/0038090 A1, Okubo et al., Feb. 9, 2023.*
US 2024/0059327 A1, Huang et al., Feb. 22, 2024.*
US 2024/0405699 A1, Suzuki et al., Dec. 5, 2024.*
International Search Report and Written Opinion mailed on Oct. 25, 2022, received for PCT Application PCT/JP2022/029983, filed on Aug. 4, 2022, 8 pages including English Translation.
Decision to Grant a Patent mailed on Mar. 7, 2023, received for JP Application 2023-504119, 5 pages including English Translation.
Office Action mailed on May 10, 2025 for corresponding Chinese patent application No. 202280097053.2.
Office Action issued on Jun. 24, 2025, in corresponding German patent Application No. 112022007078.1, 12 pages.

* cited by examiner

| TRANSFER PATH UNIT | CARRIER | SWITCHING |
|---|---|---|
| A | PRESENT | EXECUTE |
| B | ABSENT | STOP |
| C | PRESENT | EXECUTE |
| D | PRESENT | EXECUTE |
| E | PRESENT | EXECUTE |
| F | PRESENT | EXECUTE |
| G | ABSENT | STOP |
| H | ABSENT | STOP |

| TRANSFER PATH UNIT | CARRIER | SWITCHING |
|---|---|---|
| A | PRESENT | EXECUTE |
| B | ABSENT | EXECUTE |
| C | PRESENT | EXECUTE |
| D | PRESENT | EXECUTE |
| E | ABSENT | EXECUTE |
| F | ABSENT | STOP |
| G | ABSENT | STOP |
| H | ABSENT | EXECUTE |

US 12,463,574 B2

TRANSFER SYSTEM

CROSS-REFERENCE TO RELATED APPLICATION

This application is a national stage application, pursuant to 35 U.S.C. § 371, of International Patent Application No. PCT/JP2022/029983, filed Aug. 4, 2022, the entire contents of which are incorporated herein by reference.

FIELD

The present disclosure relates to a transfer system that transfers an object.

BACKGROUND

A production line in which factory automation is introduced such as a production line for assembling an industrial product or a production line for packaging a food product generally uses a transfer system that transfers a workpiece. The transfer system that has been used in many situations in recent years is a transfer system in which a transfer path for transferring a workpiece is divided into a plurality of zones, and a carrier that carries the workpiece is caused to travel by a control device disposed in each of the zones. Such a transfer system is known as one of the transfer systems that excel in production efficiency.

Patent Literature 1 discloses a transfer system using a linear motor. The transfer system disclosed in Patent Literature 1 includes a carrier with a magnet, and a plurality of coils arranged in a direction of travel of the carrier on a transfer path. The transfer system disclosed in Patent Literature 1 controls a current flowing to each of the coils by an inverter circuit such as a full-bridge inverter circuit or a half-bridge inverter circuit.

CITATION LIST

Patent Literature

Patent Literature 1: Japanese Patent Application Laid-open No. 2019-221131

SUMMARY OF INVENTION

Problem to be Solved by the Invention

In the transfer system as disclosed in Patent Literature 1, when the transfer system transitions to runtime, switching of all the inverter circuits is started. In this case, there has been a problem of an increase in noise caused by the switching of the inverter circuits in the entire transfer system, and also an increase in energy loss caused by the switching of the inverter circuits in the entire transfer system.

The present disclosure has been made in view of the above, and an object thereof is to provide a transfer system capable of reducing noise and energy loss.

Means to Solve the Problem

In order to solve the above problem and achieve the object, a transfer system according to the present disclosure includes a plurality of transfer path units that forms a transfer path, on which a transferring body moves, and causes the transferring body to move by giving power to the transferring body. Each of the plurality of the transfer path units includes: a drive unit that generates the power; and an inverter circuit that includes a switching element and supplies, to the drive unit, electric power obtained through electric power conversion by switching of the switching element. In a portion of the transfer path where the transferring body is absent, at least one of one or two or more of the transfer path units in the portion stops the switching.

Effects of the Invention

The transfer system according to the present disclosure has an effect of being capable of reducing noise and energy loss.

DESCRIPTION OF EMBODIMENTS

Hereinafter, a transfer system according to embodiments will be described in detail with reference to the drawings.

First Embodiment

Figure 1:
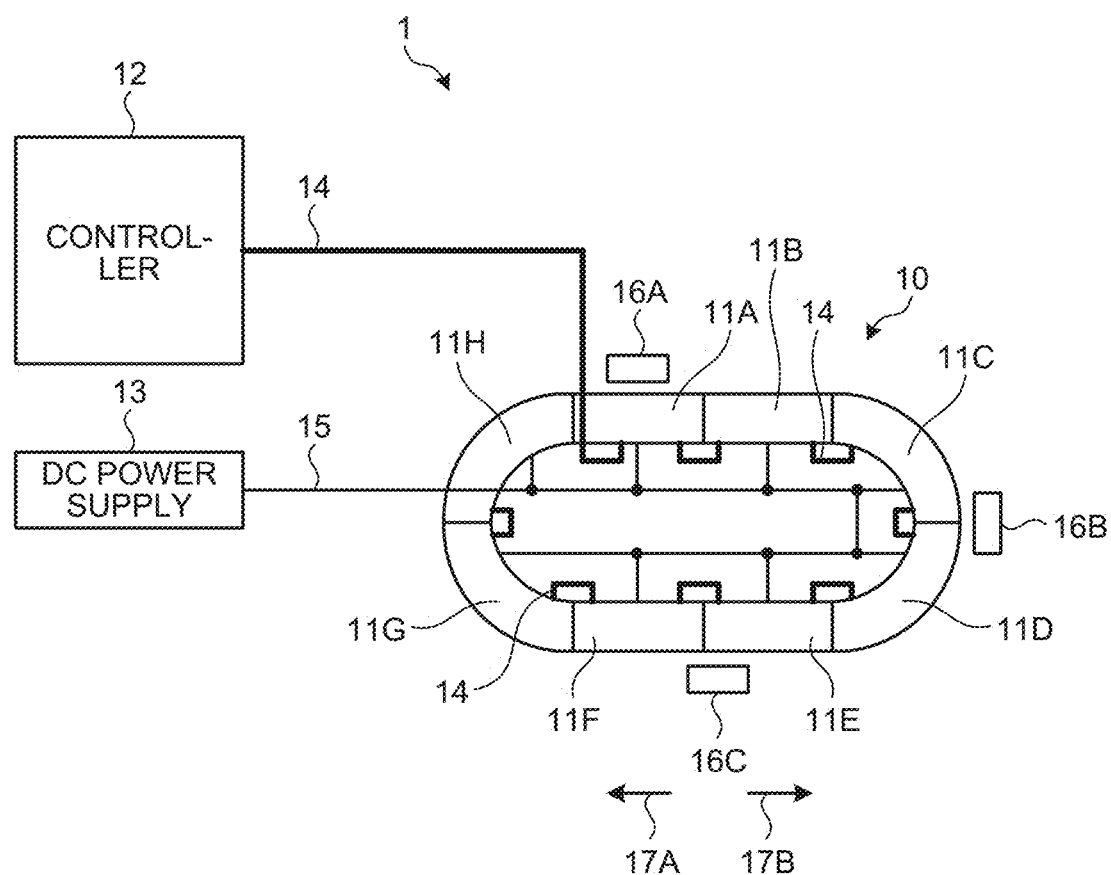
FIG. 1 is a diagram illustrating an exemplary configuration of a transfer system according to a first embodiment.

FIG. 1 is a diagram illustrating an exemplary configuration of a transfer system 1 according to a first embodiment. The transfer system 1 is a system used for transferring an object. In the first embodiment, the transfer system 1 transfers an object by moving a transferring body on which the object is placed.

The transfer system 1 includes a plurality of transfer path units 11A, 11B, 11C, 11D, 11E, 11F, 11G, and 11H, a controller 12, a direct current (DC) power supply 13, and carriers 16A, 16B, and 16C. In the following description, a transfer path unit 11 refers to each of the transfer path units 11A, 11B, 11C, 11D, 11E, 11F, 11G, and 11H that are not distinguished from each other.

The plurality of the transfer path units 11 are coupled to each other to form a transfer path 10 on which the transferring body moves. The plurality of the transfer path units 11 move the transferring body by giving power to the transferring body. Each of the carriers 16A, 16B, and 16C is the transferring body. In the following description, a carrier 16 refers to each of the carriers 16A, 16B, and 16C that are not distinguished from each other.

The transfer path 10 illustrated in FIG. 1 has an annular shape. That is, the transfer path 10 illustrated in FIG. 1 is a closed path. The transfer path 10 of the transfer system 1 may be an open path, that is, a path with a start point and an end point.

The transfer path units 11A, 11B, 11E, and 11F are each the transfer path unit 11 that is linear and forms a linear path. The transfer path units 11C, 11D, 11G, and 11H are each the transfer path unit 11 that is curved and forms a curved path, and change a direction of travel of the transferring body. The transfer path 10 may include only the transfer path unit 11 forming a curved path without including the transfer path unit 11 forming a linear path. An overall shape of the transfer path 10 is determined at will.

The carrier 16 is attached to a side surface of the transfer path 10. The carrier 16 moves along a guide rail provided on the side surface of the transfer path 10. The carrier 16 moves on the side surface of the transfer path 10 and stops on the side surface of the transfer path 10. The transfer system 1 according to the first embodiment is a moving magnet linear motor. The carrier 16 may be one that moves along a guide rail provided on an upper surface of the transfer path 10. The carrier 16 includes a permanent magnet as a mover, a permanent magnet for linear scale, and a guide roller that moves on the guide rail by rotation. FIG. 1 omits the illustration of the guide rail, the guide roller, the permanent magnet as the mover, and the permanent magnet for linear scale.

In the example illustrated in FIG. 1, the transfer system 1 includes eight of the transfer path units 11 and three of the carriers 16. The number of the transfer path units 11 included in the transfer system 1 is determined at will. That is, the number of the transfer path units 11 forming the transfer path 10 is determined at will. The transfer system 1 need only include a plurality of the transfer path units 11. The number of the carriers 16 moving on the transfer path 10 is determined at will. The transfer system 1 need only include one or a plurality of the carriers 16.

The transfer system 1 is not limited to the system including the linear motor, and may be a system including a rotary motor. The transfer system 1 may be a belt conveyor including the rotary motor and a belt rotated by the rotary motor. The belt conveyor moves a workpiece placed on the belt. The transfer system 1 may be a roller conveyor including a plurality of rollers and a rotary motor that rotates the rollers. The roller conveyor moves a workpiece placed on the rollers.

The DC power supply 13 is connected to the transfer path units 11 via a DC power supply bus 15. The DC power supply 13 is a power supply device or a power supply circuit that outputs a direct current voltage. The DC power supply 13 supplies electric power to the transfer path units 11. The transfer path units 11 share the DC power supply 13. The transfer system 1 includes a configuration in which the transfer path units 11 are connected to the DC power supply 13 by multi-drop connection. The form of connection between the transfer path units 11 and the DC power supply 13 is not limited to the multi-drop connection, and may be daisy chain connection. In the example illustrated in FIG. 1, the transfer system 1 includes one piece of the DC power supply 13, but may include a plurality of pieces of the DC power supplies 13. That is, the transfer system 1 may include a plurality of power supply domains.

The controller 12 is connected to the transfer path units 11 via a data communication line 14. The controller 12 controls each of the plurality of the transfer path units 11. The data communication line 14 includes a line connecting the controller 12 and the transfer path unit 11A, which is one of the plurality of the transfer path units 11, and lines connecting the transfer path units 11 adjacent to each other. The transfer system 1 includes a configuration in which the transfer path units 11 are connected to the controller 12 by daisy chain connection. The form of connection between the transfer path units 11 and the controller 12 is not limited to the daisy chain connection. The form of connection between the transfer path units 11 and the controller 12 may be star connection in which the transfer path units 11 are connected to the controller 12 via a communication hub. Alternatively, the transfer system 1 may include a plurality of the data communication lines 14, and the transfer path units 11 and the controller 12 may be directly connected by the data communication lines 14.

The controller 12 generates a position command indicating a position to which the carrier 16 is moved, and generates a coil drive command on the basis of the position command. The controller 12 outputs the coil drive command to the transfer path units 11. The transfer path units 11 drive coils in accordance with the coil drive command. The controller 12 outputs the coil drive command to the transfer path units 11, thereby controlling the movement of the carriers 16.

The direction of travel of each of the carriers 16 is a clockwise direction in FIG. 1 or a counterclockwise direction in FIG. 1. The direction of travel that is the clockwise direction in FIG. 1 is defined as a forward direction. The direction of travel that is the counterclockwise direction in FIG. 1 is defined as a backward direction. An arrow 17A indicates the forward direction. An arrow 17B indicates the backward direction.

The controller 12 may be connected to a control device such as a programmable logic controller that is higher than the controller 12. Such a control device outputs a command for sequence control to the controller 12. A human-machine interface may be connected to the controller 12. Such a human-machine interface receives an input from an operator. Also, such a human-machine interface outputs information indicating a status of the transfer system 1 by display or the like. The controller 12 may acquire operating information of the carrier 16 from the higher control device or the human-machine interface, and generate the position command on the basis of the operating information. The operating information is information indicating a schedule for the movement of each of the plurality of the carriers 16 on the transfer path 10.

Next, a configuration of the transfer path unit 11 will be described. Here, the configuration of the transfer path unit 11 will be described by taking as an example the transfer path unit 11 that is linear. The transfer path unit 11 that is curved is different from the transfer path unit 11 that is linear in the mode of arrangement of the coils. The configuration of the transfer path unit 11 that is curved is similar to the configuration of the transfer path unit 11 that is linear except for the difference in the mode of arrangement of the coils.

Figure 2:
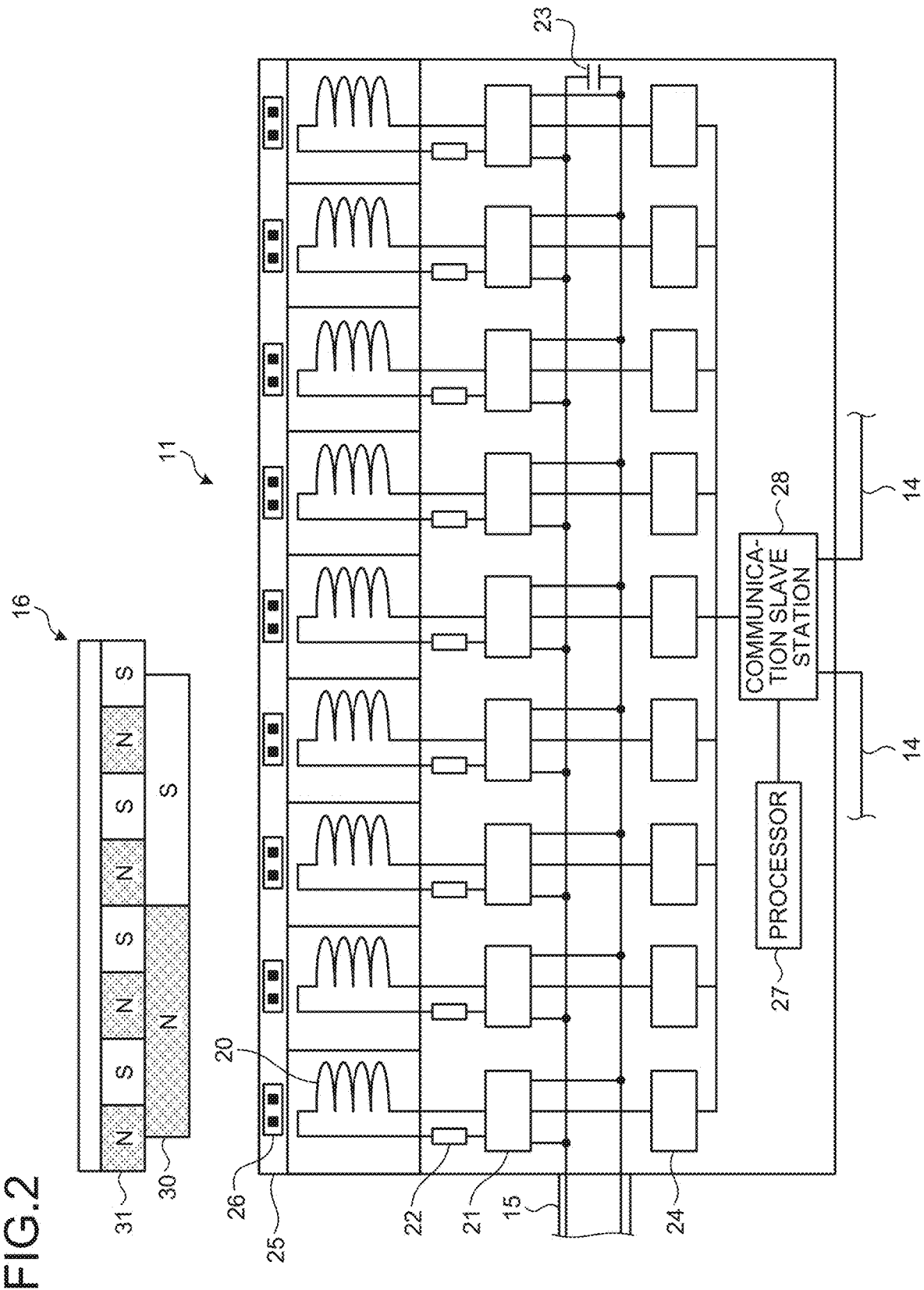
FIG. 2 is a diagram illustrating an exemplary configuration of a transfer path unit included in the transfer system according to the first embodiment.

FIG. 2 is a diagram illustrating an exemplary configuration of the transfer path unit 11 included in the transfer system 1 according to the first embodiment. FIG. 2 illustrates the transfer path unit 11 and permanent magnets 30 and 31 that the carrier 16 is equipped with. The permanent magnet 30 is the permanent magnet as the mover. The permanent magnet 31 is the permanent magnet for linear scale.

The transfer path unit 11 includes a plurality of coils 20. The coils 20 each function as a drive unit that generates power. In the example illustrated in FIG. 2, the transfer path unit 11 includes nine pieces of the coils 20. The number of the coils 20 included in the transfer path unit 11 is determined at will. In the transfer path unit 11 that is linear, the plurality of the coils 20 are arranged along a straight line. Note that, in the transfer path unit 11 that is curved, the plurality of the coils 20 are arranged along a curve.

Each of the coils 20 in the transfer path unit 11 is connected to an inverter circuit 21. The inverter circuit 21 controls a current flowing through the coil 20, The inverter circuit 21 is a single-phase full-bridge inverter circuit or a single-phase half-bridge inverter circuit. The inverter circuit 21 may be a three-phase inverter circuit connected to three of the coils 20, The coil 20 generates electromagnetic force as the power for moving the carrier 16 by electric power supplied from the inverter circuit 21. Each of the coils 20 in the transfer path unit 11 is connected to a current sensor 22. The current sensor 22 detects an actual coil current value that is a current value of the current flowing through the coil 20.

The inverter circuit 21 is connected to a current controller 24 that controls the inverter circuit 21. The current controller 24 calculates a voltage value of a voltage applied to the coil 20 on the basis of a current command value of the current flowing through the coil 20 and the actual coil current value detected by the current sensor 22. The current controller 24 transmits a pulse width modulation (PWM) signal obtained by comparing the calculated voltage value with a triangular wave to the inverter circuit 21. The current controller 24 transmits the PWM signal to the inverter circuit 21 to cause the inverter circuit 21 to perform switching. As a result, the current controller 24 applies, to the coil 20, the voltage for passing the current of a desired current value through the coil 20. The current controller 24 may calculate the voltage value of the voltage applied to the coil 20 by performing proportional integral differential (PID) control of the voltage applied to the coil 20 on the basis of a deviation between the current command value and the actual coil current value.

The inverter circuit 21 is connected to a positive terminal wiring of the DC power supply bus 15 and a negative terminal wiring of the DC power supply bus 15. The positive terminal wiring is a wiring connected to a positive terminal of the DC power supply 13. The negative terminal wiring is a wiring connected to a negative terminal of the DC power supply 13. A capacitor 23 is connected between the line corresponding to the positive terminal of the DC power supply 13 and line corresponding to the negative terminal of the DC power supply 13.

The transfer path unit 11 includes a linear scale 25 and a processor 27. The linear scale 25 is a detector that detects the position of the carrier 16 on the transfer path unit 11. The linear scale 25 is set up on the transfer path 10 when the plurality of the transfer path units 11 are coupled to each other to form the transfer path 10. The processor 27 is a central processing unit (CPU), which is also referred to as a central processor, a processing unit, an arithmetic unit, a microprocessor, a microcomputer, a processor, or a digital signal processor (DSP).

The linear scale 25 includes a plurality of position sensors 26. The position sensors 26 are each a sensor that detects a magnetic field, such as a Hall sensor or a magnetoresistive sensor. The position sensors 26 each detect a magnetic field of the permanent magnet 30 or a magnetic field of the permanent magnet 31. Here, the position sensor 26 is a Hall sensor on which two Hall elements are mounted. The interval between the two Hall elements corresponds to one-half of the magnetic pole pitch of the permanent magnet 31. Each of the Hall elements converts the magnetic field into an electric signal and outputs the electric signal. The electric signal output from each of the Hall elements changes as the carrier 16 moves. The waveform of the electric signal output from one of the Hall elements is a sine wave. The waveform of the electric signal output from the other one of the Hall elements is a cosine wave.

An analog to digital (AD) converter included in the processor 27 detects the sine wave and the cosine wave. The processor 27 calculates an arctangent on the basis of information of the sine wave and information of the cosine wave, thereby detecting the position of the carrier 16 with respect to the position sensor 26. As a result, the processor 27 acquires position information indicating the position of the carrier 16.

The transfer path unit 11 includes a communication slave station 28. The communication slave station 28 is a communication slave station on the side of the transfer path unit 11. The data communication line 14 is connected to the communication slave station 28. In a case where the transfer path units 11 and the controller 12 are connected by daisy chain connection, the communication slave station 28 is configured to be able to connect two of the data communication lines 14. For each of the plurality of the coils 20 included in the transfer path unit 11, the communication slave station 28 receives, from the controller 12, a current command indicating the current command value of the current flowing through the coil 20. The communication slave station 28 acquires the position information acquired by the position sensor 26 from each of the plurality of the position sensors 26 included in the linear scale 25. The communication slave station 28 transmits the acquired position information to the controller 12.

The communication slave station 28 performs, for example, regular cycle communication of receiving the current command and transmitting the position information in a regular cycle. Instead of performing such regular cycle communication, the communication slave station 28 may irregularly receive the current command and transmit the position information.

As described above, the transfer path unit 11 mainly includes the function of performing energization control on the coils 20 and the function of acquiring the position information. All of the plurality of the transfer path units 11 forming the transfer path 10 similarly perform the energization control on the coils 20 and similarly acquire the position information.

Figure 3:
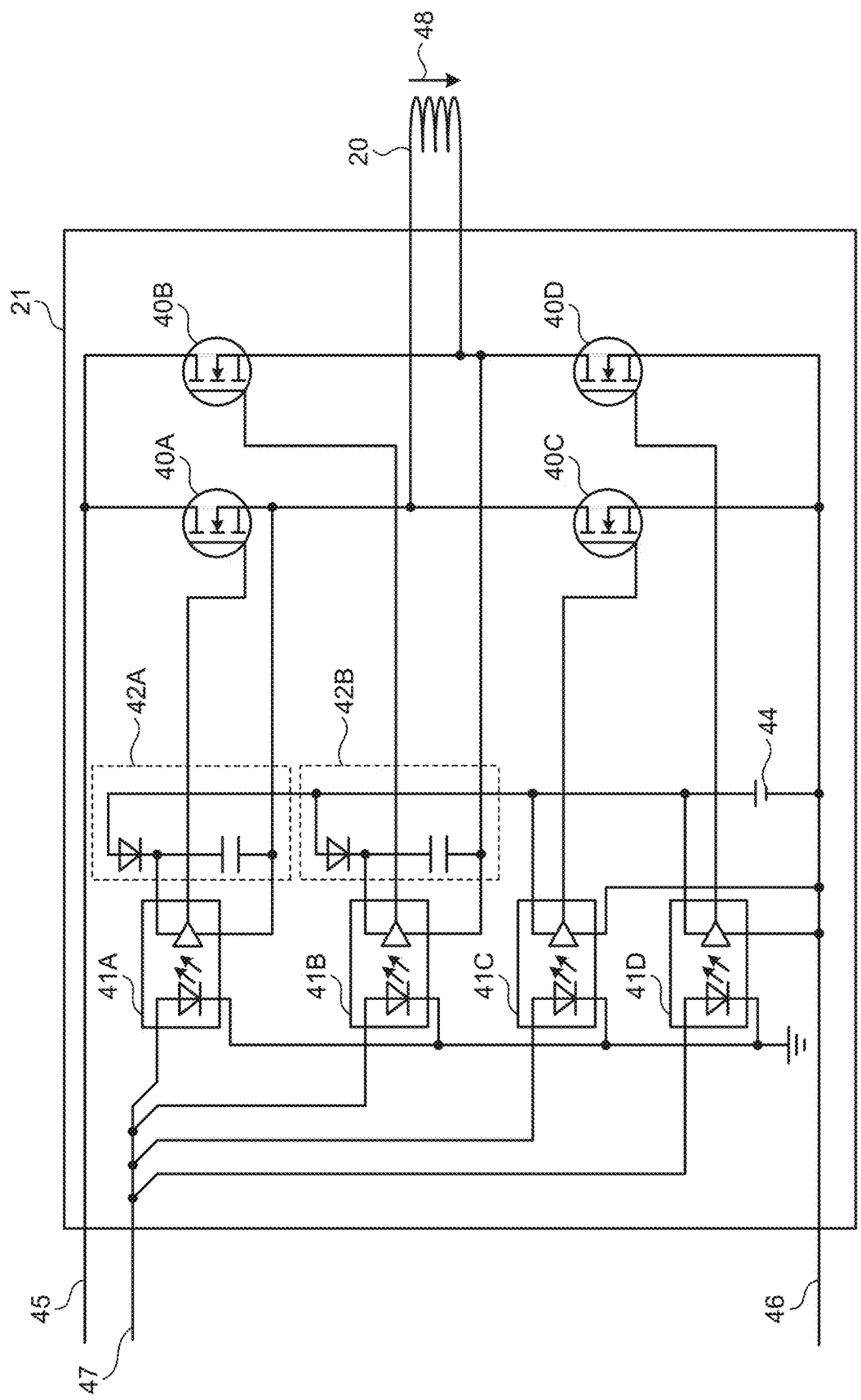
FIG. 3 is a diagram illustrating an exemplary configuration of an inverter circuit included in the transfer path unit of the first embodiment.

Next, a configuration of the inverter circuit 21 will be described. FIG. 3 is a diagram illustrating an exemplary configuration of the inverter circuit 21 included in the transfer path unit 11 of the first embodiment. Here, a case where the inverter circuit 21 is a single-phase full-bridge inverter circuit is taken as an example.

The inverter circuit 21 includes four switching elements 40A, 40B, 40C, and 40D, four insulated gate drivers 41A, 41B, 41C, and 41D, two bootstrap circuits 42A and 42B, and a secondary power supply 44. The inverter circuit 21 also includes a positive terminal wiring 45, a negative terminal wiring 46, and a signal line 47. The positive terminal wiring 45 is a wiring connected to the positive terminal wiring of the DC power supply bus 15. The negative terminal wiring 46 is a wiring connected to the negative terminal wiring of the DC power supply bus 15. The signal line 47 is a signal line to which the PWM signal from the current controller 24 is input, The switching elements 40A and 40B are connected to the positive terminal wiring 45. The switching elements 40A and 40B are switching elements connected between the positive terminal of the DC power supply 13 and the coil 20. The switching elements 40A and 40B are power switching elements for an upper arm. The switching elements 40C and 40D are connected to the negative terminal wiring 46. The switching elements 40C and 40D are switching elements connected between the negative terminal of the DC power supply 13 and the coil 20. The switching elements 40C and 40D are power switching elements for a lower arm. The switching elements 40A, 40B, 40C, and 40D form a full-bridge circuit. Each of the switching elements 40A, 40B, 40C, and 40D is, for example, a field effect transistor (FET). Each of the switching elements 40A, 40B, 40C, and 40D may be an insulated gate bipolar transistor (IGBT) or the like.

The insulated gate drivers 41A and 41B are insulated gate drivers for the upper arm. The insulated gate drivers 41A and 41B are switching driver circuits for driving the upper arm. A gate signal line of the insulated gate driver 41A is connected to the switching element 40A. A gate signal line of the insulated gate driver 41B is connected to the switching element 40B. The insulated gate drivers 41C and 41D are insulated gate drivers for the lower arm. The insulated gate drivers 41C and 41D are switching driver circuits for driving the lower arm. A gate signal line of the insulated gate driver 41C is connected to the switching element 40C. A gate signal line of the insulated gate driver 41D is connected to the switching element 40D.

When the switching elements 40A and 40D are turned on and the switching elements 40B and 40C are turned off, the current of the actual coil current value flows through the coil 20 in a direction indicated by an arrow 48. On the other hand, when the switching elements 40A and 40D are turned off and the switching elements 40B and 40C are turned on, the current of the actual coil current value flows through the coil 20 in a direction opposite to that indicated by the arrow 48. The inverter circuit 21 thus switches the polarity of the current flowing through the coil 20. Moreover, the inverter circuit 21 turns on and off gate signals of the insulated gate drivers 41A, 41B, 41C, and 41D at a high frequency in accordance with the PWM signal. The inverter circuit 21 adjusts the actual coil current value by turning on and off the gate signals.

When all the switching elements 40A, 40B, 40C, and 40D of the inverter circuit 21 are turned off, the coil 20 is opened. That is, the energization of the coil 20 is cut off. When the switching elements 40A and 40D are turned on and the switching elements 40B and 40C are turned off, the coil 20 forms a closed circuit. When the switching elements 40A and 40D are turned off and the switching elements 40B and 40C are turned on, the coil 20 forms a closed circuit.

Each of the switching elements 40A, 40B, 40C, and 40D generates noise at the time of switching from off to on or from on to off. Each of the switching elements 40A, 40B, 40C, and 40D generates an energy loss at the time of switching from off to on or from on to off.

The secondary power supply 44 is connected to a secondary side of the insulated gate drivers 41C and 41D. The bootstrap circuit 42A is connected to a secondary side of the insulated gate driver 41A. The bootstrap circuit 42B is connected to a secondary side of the insulated gate driver 41B. The bootstrap circuit 42A is a bootstrap power supply circuit that drives the insulated gate driver 41A. The bootstrap circuit 42B is a bootstrap power supply circuit that drives the insulated gate driver 41B. The inverter circuit 21 includes the bootstrap circuits 42A and 42B that drive the insulated gate drivers 41A and 41B, thereby including just one piece of the secondary power supply 44. The manufacturing cost of the inverter circuit 21 can be reduced compared to a case where two pieces of the secondary power supplies 44 are included.

In the first embodiment, each of the plurality of the transfer path units 11 of the transfer system 1 acknowledges whether or not the carrier 16 is present in the transfer path unit 11 from a detection result by the linear scale 25. Among the plurality of the transfer path units 11 of the transfer system 1, the transfer path unit 11 having acknowledged that the carrier 16 is absent in the transfer path unit 11 stops switching of the inverter circuit 21. Accordingly, in a portion of the transfer path 10 where the carrier 16 is absent, one or two or more of the transfer path units 11 in the portion stop the switching of the inverter circuit 21.

Figures 4, 5:
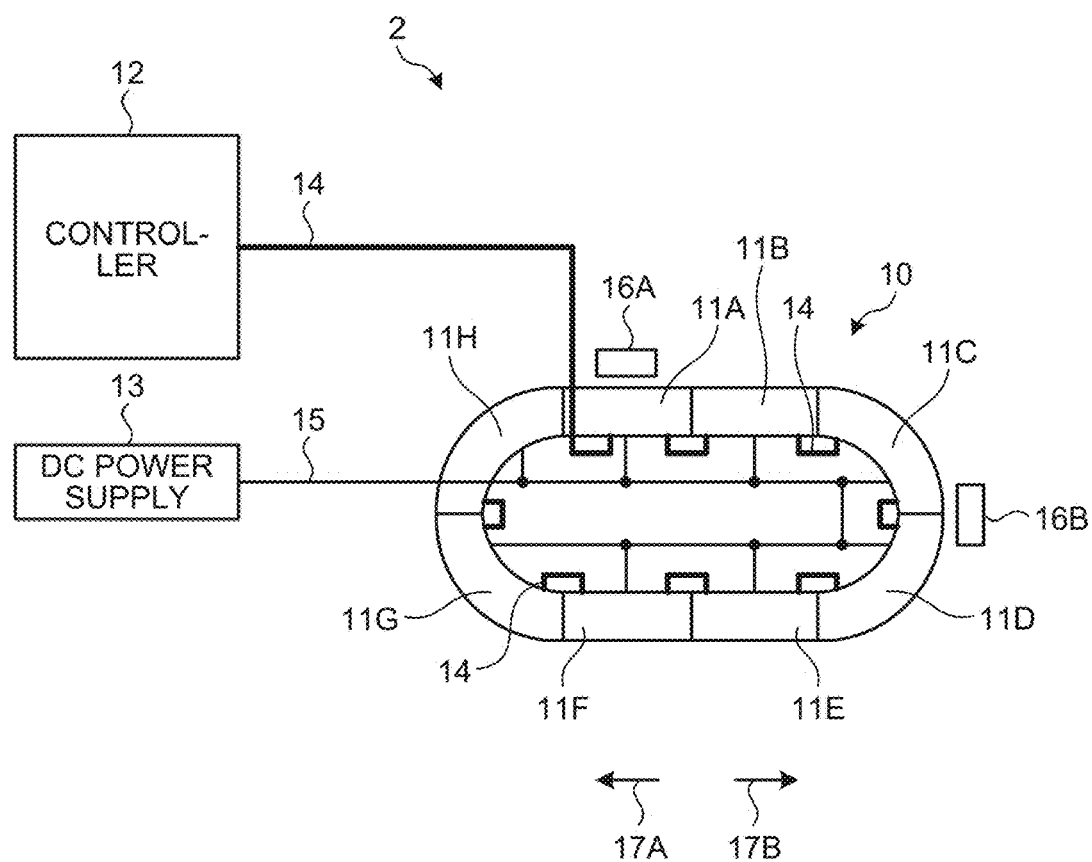
FIG. 4 is a table for explaining an operation of each transfer path unit included in the transfer system according to the first embodiment.
FIG. 5 is a diagram illustrating an exemplary configuration of a transfer system according to a second embodiment.

Next, a description will be given of the operation of the transfer path unit 11 when the switching of the inverter circuit 21 is stopped. Here, the operation of each of the transfer path units 11 will be described by taking, as an example, a case where the transfer system 1 is in the state illustrated in FIG. 1. When the transfer system 1 is in the state illustrated in FIG. 1, the carrier 16A is present in the transfer path unit 11A. The carrier 16B is present across the transfer path unit 11C and the transfer path unit 11D. The carrier 16C is present across the transfer path unit 11E and the transfer path unit 11F, FIG. 4 is a table for explaining the operation of each of the transfer path units 11 included in the transfer system 1 according to the first embodiment. The table illustrated in FIG. 4 represents, for each of the plurality of the transfer path units 11, the presence or absence of the carrier 16 and whether to execute the switching or stop the switching. In the column of "transfer path unit" in FIG. 4, "A", "B", . . . , and "H" represent the transfer path unit 11A, the transfer path unit 11B, . . . , and the transfer path unit 11H, respectively.

The processor 27 of the transfer path unit 11B acknowledges that the carrier 16 is absent in the transfer path unit 11B since the carrier 16 is not detected by the linear scale 25. The transfer path unit 11B is the transfer path unit 11 in which the absence of the carrier 16 is acknowledged from the detection result by the linear scale 25. The processor 27 of the transfer path unit 11B stops the switching of the inverter circuits 21 in the transfer path unit 11B.

When the carrier 16 is absent in the transfer path unit 11B, there is no target to which the transfer path unit 11B gives the driving force. In this case, since there is no target to which the transfer path unit 11B gives the driving force, the transfer path unit 11B stops the switching to stop the current to the coils 20.

The transfer path units 11G and 11H are, as with the transfer path unit 11B, the transfer path units 11 in which the absence of the carrier 16 is acknowledged from the detection result by the linear scale 25. The transfer path units 11G and 11H stop the switching of the inverter circuits 21. The transfer path units 11G and 11H stop the switching to stop the current to the coils 20.

Note that the processor 27 may generate a switching stop instruction when acknowledging that the carrier 16 is absent in the transfer path unit 11. In this case, the transfer path unit 11 stops the switching of the inverter circuits 21 in accordance with the switching stop instruction.

The processor 27 of the transfer path unit 11A acknowledges that the carrier 16 is present on the basis of the position information. The transfer path unit 11A is the transfer path unit 11 in which the presence of the carrier 16 is acknowledged from the detection result by the linear scale 25. Each of the transfer path units 11C, 11D, 11E, and 11F is, as with the transfer path unit 11A, the transfer path unit 11 in which the presence of the carrier 16 is acknowledged from the detection result by the linear scale 25. Each of the transfer path units 11A, 11C, 11D, 11E, and 11F executes the switching of the inverter circuits 21. Each of the transfer path units 11A, 11C, 11D, 11E, and 11F executes the switching to pass the current to the coils 20.

In the first embodiment as described above, among the plurality of the transfer path units 11 of the transfer system 1, the transfer path unit 11 in which the absence of the carrier 16 is acknowledged from the detection result by the linear scale 25 stops the switching of the inverter circuits 21. On the other hand, among the plurality of the transfer path units 11 of the transfer system 1, the transfer path unit 11 in which the presence of the carrier 16 is acknowledged from the detection result by the linear scale 25 executes the switching of the inverter circuits 21. Each of the transfer path units 11 switches between execution of the switching and stop of the switching in accordance with whether or not the carrier 16 is present.

When stopping the switching, the transfer path unit 11 fixes the switching elements 40A, 40B, 40C, and 40D to the off state and opens the coil 20. Alternatively, when stopping the switching, the transfer path unit 11 fixes the switching elements 40A, 40B, 40C, and 40D to the on state and forms a closed circuit including the coil 20, In general, the time for which the carrier 16 is absent on the transfer path unit 11 is sufficiently long with respect to the switching cycle by the PWM signal. Therefore, the transfer system 1 can greatly reduce the number of times of the switching in the transfer system 1 as a whole by stopping the switching of the transfer path unit 11 in which the carrier 16 is absent. The transfer system 1 can reduce noise caused by the switching in the transfer system 1 as a whole by reducing the number of times of the switching. Moreover, the transfer system 1 can reduce the energy loss caused by the switching in the transfer system 1 as a whole by reducing the number of times of the switching.

When stopping the switching, the inverter circuit 21 may fix the switching elements 40A and 40B to the off state and fix the switching elements 40C and 40D to the on state. That is, the switching elements 40A and 40B as the upper arm are in an open state during the period in which the switching is stopped, and the switching elements 40C and 40D as the lower arm are in an energized state during the period in which the switching is stopped.

When the switching elements 40C and 40D are fixed to the on state in the configuration including the bootstrap circuits 42A and 42B, capacitors of the bootstrap circuits 42A and 42B continue to store charge. Therefore, the inverter circuit 21 can store charge in the bootstrap circuits 42A and 42B by using the period in which the switching is stopped.

The inverter circuit 21 performs charging while the switching is stopped, thereby being able to immediately activate the insulated gate drivers 41A and 41B at the timing when the carrier 16 enters the transfer path unit 11 in which the carrier 16 has been absent. The inverter circuit 21 immediately activates the insulated gate drivers 41A and 41B to be able to immediately start the control of the current flowing to the coil 20. As a result, the transfer system 1 can smoothly move the carrier 16 between the transfer path units 11.

When the carrier 16 is situated across the transfer path units 11 adjacent to each other, the transfer system 1 executes the switching in the adjacent transfer path units 11. As a result, the transfer system 1 can prevent a decrease in thrust of the carrier 16 when the carrier 16 is situated across the transfer path units 11 adjacent to each other.

According to the first embodiment, in the transfer system 1, in the portion of the transfer path 10 where the transferring body is absent, one or two or more of the transfer path units 11 in the portion stop the switching. As a result, the transfer system 1 has the effect of being able to reduce the noise and the energy loss.

Second Embodiment

In a second embodiment, an example will be described in which, among the transfer path units 11 where the carrier 16 is absent, the transfer path unit 11 adjacent to the transfer path unit 11 where the carrier 16 is present executes the switching. In the second embodiment, in a communication cycle, when the carrier 16 that has moved through a certain one of the transfer path units 11 enters the transfer path unit 11 adjacent thereto, the carrier 16 can be moved smoothly. The communication cycle is a cycle of communication between the controller 12 and the transfer path unit 11. In the second embodiment, components identical to those in the above first embodiment are denoted by the same reference numerals as those assigned to such components in the first embodiment, and a configuration different from that of the first embodiment will be mainly described.

FIG. 5 is a diagram illustrating an exemplary configuration of a transfer system 2 according to the second embodiment. In the transfer system 2, processing by the controller 12 is different from that of the first embodiment. The configuration of the transfer system 2 is similar to the configuration of the transfer system 1 illustrated in FIG. 1. The transfer system 2 includes the configuration similar to the configuration illustrated in FIG. 2 or FIG. 3.

In the example illustrated in FIG. 5, the transfer system 2 includes eight of the transfer path units 11 and two of the carriers 16. The number of the transfer path units 11 included in the transfer system 2 is determined at will. That is, the number of the transfer path units 11 forming the transfer path 10 is determined at will. The transfer system 2 need only include a plurality of the transfer path units 11. The number of the carriers 16 moving on the transfer path 10 is determined at will. The transfer system 2 need only include one or a plurality of the carriers 16.

The communication slave station 28 of the transfer path unit 11 acquires the position information acquired by the position sensor 26 from each of the plurality of the position sensors 26 included in the linear scale 25. The communication slave station 28 transmits the acquired position information to the controller 12 via the data communication line 14.

The controller 12 receives the position information transmitted from the communication slave station 28 of each of the transfer path units 11. The controller 12 combines the position information from the communication slave stations 28 of the transfer path units 11 to acquire the position information indicating the position of the carrier 16 on the transfer path 10. The controller 12 determines, on the basis of the position information indicating the position of the carrier 16 on the transfer path 10, the transfer path unit 11 that executes the switching and the transfer path unit 11 that stops the switching.

The controller 12 determines, among the plurality of the transfer path units 11, a first transfer path unit and a second transfer path unit as the transfer path units 11 that execute the switching. The controller 12 determines, among the plurality of the transfer path units 11, the transfer path unit 11 other than the first transfer path unit and the second transfer path unit as the transfer path unit 11 that stops the switching. The first transfer path unit is the transfer path unit 11 in which the carrier 16 as the transferring body is present. The second transfer path unit includes M piece or pieces of the transfer path units 11 that are located adjacent to the first transfer path unit in front of the first transfer path unit in the direction of travel of the carrier 16 on the transfer path 10, and N piece or pieces of the transfer path units 11 that are located adjacent to the first transfer path unit behind the first transfer path unit in the direction of travel. Each of M and N is an integer of 1 or more determined at will. In the second embodiment, in the portion of the transfer path 10 where the carrier 16 is absent, at least one of one or two or more of the transfer path units 11 in the portion stops the switching.

Next, a description will be given of the operation of the transfer path unit 11 when the switching of the inverter circuit 21 is stopped. Here, the operation of each of the transfer path units 11 will be described by taking, as an example, a case where the transfer system 2 is in the state illustrated in FIG. 5. When the transfer system 2 is in the state illustrated in FIG. 5, the carrier 16A is present in the transfer path unit 11A. The carrier 16B is present across the transfer path unit 11C and the transfer path unit 11D.

Figures 6, 7:
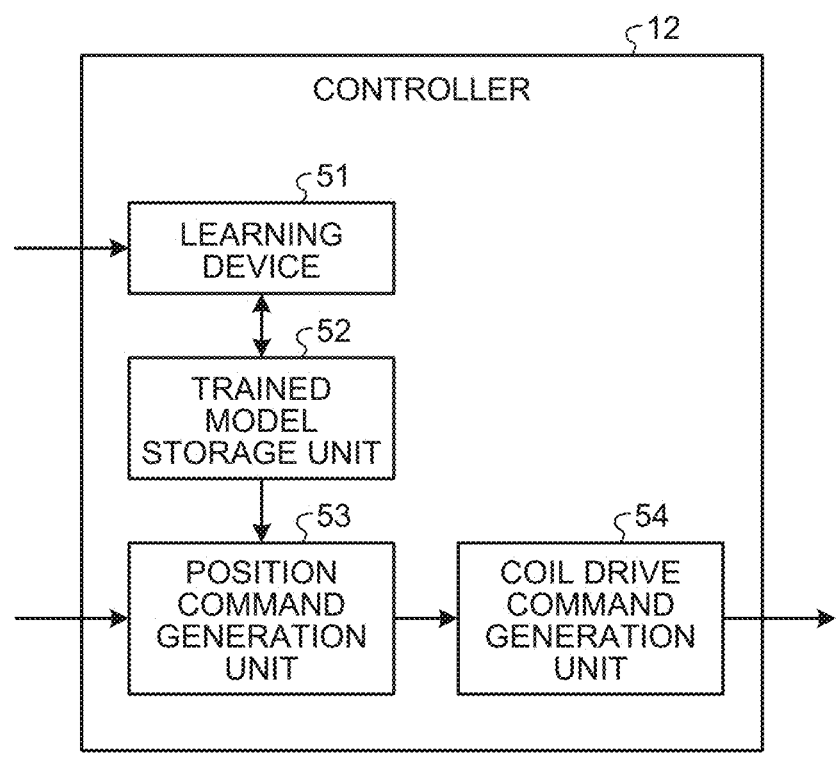
FIG. 6 is a table for explaining an operation of each transfer path unit included in the transfer system according to the second embodiment.
FIG. 7 is a diagram illustrating an exemplary configuration of a controller included in a transfer system according to a third embodiment.

FIG. 6 is a table for explaining the operation of each of the transfer path units 11 included in the transfer system 2 according to the second embodiment. The controller 12 acknowledges the first transfer path unit from the position information acquired. In the case of the example illustrated in FIG. 5, the transfer path unit 11A where the carrier 16A is present and the transfer path units 11C and 11D where the carrier 16B is present are the first transfer path units.

Next, the controller 12 acknowledges the second transfer path unit on the basis of the acknowledged first transfer path units. Here, M=1 and N=1 are set. In the case of the example illustrated in FIG. 5, each of the transfer path units 11B, 11E, and 11H is the second transfer path unit. The controller 12 determines the transfer path units 11A, 11C, and 11D being the first transfer path units and the transfer path units 11B, 11E, and 11H being the second transfer path units as the transfer path units 11 that execute the switching. The controller 12 transmits a switching execution instruction to each of the transfer path units 11A, 11B, 11C, 11D, 11E, and 11H. The switching execution instruction is, for example, a signal in which a flag indicating execution of the switching is turned on.

Next, the controller 12 acknowledges, among the plurality of the transfer path units 11 included in the transfer system 1, the transfer path unit 11 other than the first transfer path units and the second transfer path units. In the case of the example illustrated in FIG. 5, each of the transfer path units 11F and 11G is the transfer path unit 11 other than the first transfer path units and the second transfer path units. The controller 12 determines each of the transfer path units 11F and 11G as the transfer path unit 11 that stops the switching. The controller 12 transmits a switching stop instruction to each of the transfer path units 11F and 11G. The switching stop instruction is, for example, a signal in which a flag indicating execution of the switching is turned off.

The communication slave station 28 of each of the transfer path units 11A, 11B, 11C, 11D, 11E, and 11H receives the switching execution instruction from the controller 12. Each of the transfer path units 11A, 11B, 11C, 11D, 11E, and 11H executes the switching of the inverter circuits 21 in accordance with the switching execution instruction.

The communication slave station 28 of each of the transfer path units 11F and 11G receives the switching stop instruction from the controller 12. Each of the transfer path units 11F and 11G stops the switching of the inverter circuits 21 in accordance with the switching stop instruction.

Here, M and N are set in advance, M being the number of the second transfer path units located adjacent to the first transfer path unit in front of the first transfer path unit in the direction of travel, N being the number of the second transfer path units located adjacent to the first transfer path unit behind the first transfer path unit in the direction of travel. At least one of M or N may be calculated on the basis of the speed of the carrier 16 on the transfer path 10.

Here, an example of a method of calculating M and N on the basis of the speed of the carrier 16 on the transfer path 10 will be described. Here, a path length of the transfer path unit 11 is represented by L, a maximum speed of the carrier 16 is represented by Vmax, and a communication cycle of communication between the controller 12 and the transfer path unit 11 is represented by Tcyc. Each of M and N is obtained by rounding up the fractional part of L/(Vmax× Tcyc).

As described above, in the second embodiment, the transfer system 2 executes the switching not only in the first transfer path unit in which the carrier 16 is present but also in the second transfer path unit adjacent to the first transfer path unit. When the carrier 16 moving through the first transfer path unit enters the second transfer path unit adjacent thereto, the carrier 16 enters the second transfer path unit in which the switching is being executed. As a result, in the transfer system 2, the carrier 16 does not enter the transfer path unit 11 in which the switching is stopped in the communication cycle, whereby the carrier 16 can be moved smoothly through the portion where the transfer path units 11 are adjacent to each other.

In the above description, M and N are each an integer of 1 or more determined at will, but at least one of M or N may be zero. That is, the second transfer path unit need only be at least either one or two or more of the transfer path units 11 that are located adjacent to the first transfer path unit in front of the first transfer path unit in the direction of travel, or one or two or more of the transfer path units 11 that are located adjacent to the first transfer path unit behind the first transfer path unit in the direction of travel. The transfer system 2 may switch one of M and N to zero or an integer of 1 or more for each communication cycle on the basis of the direction of travel of the carrier 16 in each communication cycle.

According to the second embodiment, the transfer system 2 can smoothly move the carrier 16 by executing the switching in the first transfer path unit and the second transfer path unit. In addition, the transfer system 2 stops the switching in the transfer path unit 11 other than the first transfer path unit and the second transfer path unit among the plurality of the transfer path units 11/thereby stopping the switching in at least one of one or two or more of the transfer path units 11 in the portion of the transfer path 10 where the carrier 16 is absent. As a result, the transfer system 2 can reduce the noise and the energy loss.

Third Embodiment

In a third embodiment, an example will be described in which the controller 12 applies learning to the generation of the position command that is output to each of the transfer path units 11. From the operating information of each of the carriers 16, the controller 12 generates the position command to reduce the number of the transfer path units 11 that execute the switching, on the basis of a trained model.

For example, it is assumed that the operating information acquired indicates that the carrier 16 reaches a target position three meters ahead of a current position two seconds after a certain time point. In this case, various patterns are possible as the patterns of the position command for moving the carrier 16. One of the possible patterns is a pattern in which the carrier 16 is moved by trapezoidal acceleration/deceleration from a start point to an end point for the two seconds. Examples of other patterns include a pattern in which the carrier 16 is moved by trapezoidal acceleration/deceleration for one second from the start point and is stopped for the remaining one second, and a pattern in which the carrier 16 is stopped for one second from the start point and is moved by trapezoidal acceleration/deceleration for the remaining one second. An infinite number of patterns are possible as the patterns of the position command.

When the pattern of the position command for each of the carriers 16 is set appropriately, the number of the transfer path units 11 that execute the switching for each control cycle can be reduced. In the third embodiment, the position command for reducing the number of the transfer path units 11 that execute the switching is derived by a machine learning method.

The configuration of the transfer system 2 according to the third embodiment is assumed to be similar to the configuration of the transfer system 2 illustrated in FIG. 5. The controller 12 of the transfer system 2 according to the third embodiment acquires the position information indicating the position of the carrier 16 on the transfer path 10, as in the case of the second embodiment. The third embodiment is different from the case of the second embodiment in that components for learning are added to the controller 12.

FIG. 7 is a diagram illustrating an exemplary configuration of the controller 12 included in the transfer system 2 according to the third embodiment. The controller 12 includes a learning device 51, a trained model storage unit 52, a position command generation unit 53, and a coil drive command generation unit 54.

The learning device 51 learns a relationship between the operating information of each of the plurality of the carriers 16 included in the transfer system 2 and the position command for reducing the number of the transfer path units 11 that execute the switching. The operating information is the information indicating the schedule for the movement of each of the plurality of the carriers 16 on the transfer path 10. The position command indicates the position to which the carrier 16 is moved. The learning device 51 outputs the trained model that is a result of learning. The trained model storage unit 52 stores the trained model.

The position command generation unit 53 generates the position command indicating the position to which the carrier 16 is moved for each of the plurality of the carriers 16 included in the transfer system 2. The position command generation unit 53 reads the trained model from the trained model storage unit 52. The position command generation unit 53 inputs the operating information to the trained model, thereby inferring the position command that reduces the number of the transfer path units 11 that execute the switching. The position command generation unit 53 generates the position command by such inference.

The coil drive command generation unit 54 generates the coil drive command on the basis of the position command. The controller 12 outputs the coil drive command to each of the transfer path units 11, thereby controlling the movement of each of the carriers 16.

Figure 8:
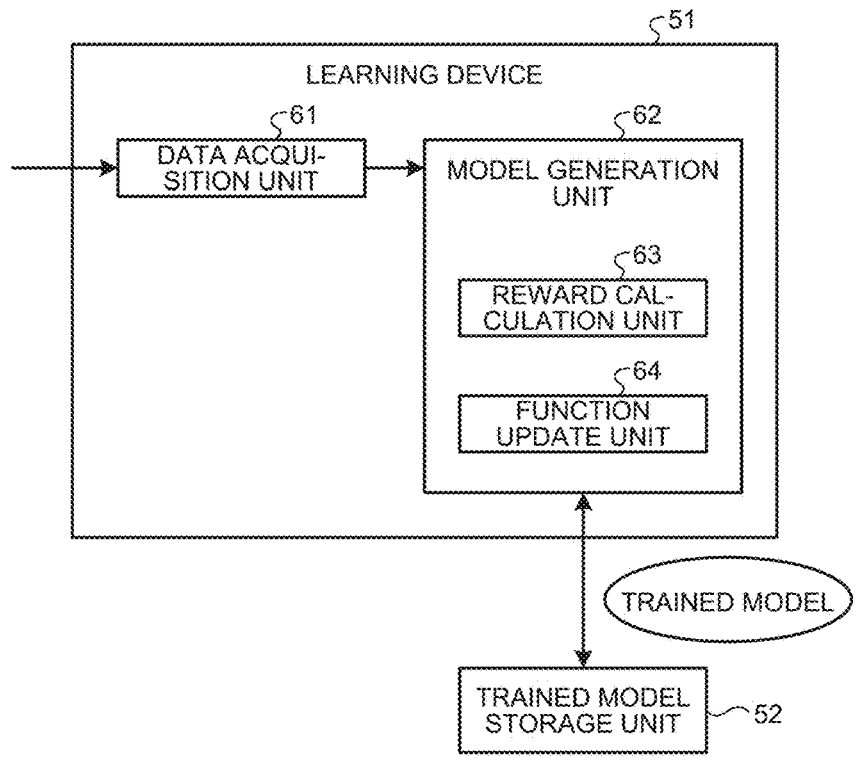
FIG. 8 is a diagram illustrating an exemplary configuration of a learning device included in the controller of the third embodiment.

FIG. 8 is a diagram illustrating an exemplary configuration of the learning device 51 included in the controller 12 of the third embodiment. The learning device 51 includes a data acquisition unit 61 and a model generation unit 62. The data acquisition unit 61 acquires training data and creates a data set obtained by combining the training data. The training data is the operating information and the position command. That is, the data acquisition unit 61 acquires the training data including the operating information and the position command. The model generation unit 62 generates the trained model using the training data. The model generation unit 62 generates the trained model, which is used for the inference of the position command from the operating information, on the basis of the training data.

A learning algorithm used by the model generation unit 62 can be a known algorithm such as supervised learning, unsupervised learning, or reinforcement learning. As an example, a case will be described where reinforcement learning is applied as the learning algorithm used by the model generation unit 62. In reinforcement learning, a subject as an agent acting in a certain environment observes a current state and determines an action to take. The agent receives a reward from the environment by choosing an action and learns a policy that maximizes the reward through a series of actions. As representative methods of reinforcement learning, Q learning, TD learning, and the like are known. For example, in the case of Q learning, an action-value table that is a typical update expression of an action-value function Q (s, a) is expressed by the following Formula (1). The action-value function Q (s, a) represents an action value "Q" that is a value of an action of choosing an action "a" under an environment "s".

Formula 1

$$Q(s_t, a_t) \leftarrow Q(s_t, a_t) + \alpha(r_{t+1} + \gamma \max_a Q(s_{t+1}, a_t) - Q(s_t, a_t)) \quad (1)$$

In Formula (1), "$s_t$" represents an environment at time "t". An action at time "t" is represented by "$a_t$". The action "$a_t$" changes the environment to "$s_{t+1}$". A reward earned by the change in the environment is represented by "$r_{t+1}$". A discount factor is represented by "$\gamma$". A learning rate is represented by "α". The operating information corresponds to the environment "$s_t$". The position command corresponds to the action "$a_t$".

The update expression expressed by Formula (1) increases the action value "Q" if the action value of the action "a" that is the best action at time "t+1" is higher than the action value "Q" of the action "a" taken at time "t", or decreases the action value "Q" in an opposite case. In other words, the action-value function Q (s, a) is updated such that the action value "Q" of the action "a" at time "t" approaches the best action value at time "t+1". As a result, the best action value in a certain environment sequentially propagates to action values in previous environments.

The model generation unit 62 includes a reward calculation unit 63 and a function update unit 64. The reward calculation unit 63 calculates a reward on the basis of the data set. The function update unit 64 updates a function for determining an operation plan in accordance with the reward calculated by the reward calculation unit 63.

Specifically, the reward calculation unit 63 calculates the reward "r" on the basis of the number of the transfer path units 11 that execute the switching for each control cycle. For example, when the number of the transfer path units 11 that execute the switching is less than or equal to the number of the carriers 16 included in the transfer system 2, the reward calculation unit 63 increases the reward "r". The reward calculation unit 63 increases the reward "r" by giving "1" that is a value of the reward. Note that the value of the reward is not limited to "1". On the other hand, when the number of the transfer path units 11 that execute the switching is larger than the number of the carriers 16 included in the transfer system 2, the reward calculation unit 63 decreases the reward "r". The reward calculation unit 63 decreases the reward "r" by giving "−1" that is a value of the reward. Note that the value of the reward is not limited to "−1".

Figure 9:
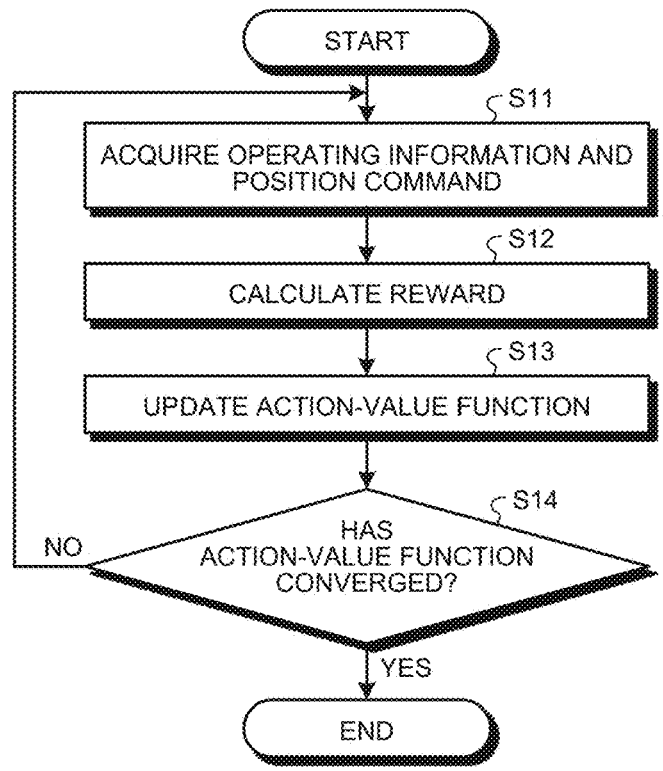
FIG. 9 is a flowchart illustrating a processing procedure of the learning device included in the controller of the third embodiment.

The function update unit 64 updates the function that is a model for determining the position command in accordance with the reward calculated by the reward calculation unit 63. The function can be updated by, for example, updating the action-value table according to the data set. The action-value table is a data set in which an arbitrary action and its action value are stored in association with each other in a table form. For example, in the case of Q learning, the action-value function Q ($s_t$, $a_t$) expressed by the above Formula (1) is used as the function for determining the position command, FIG. 9 is a flowchart illustrating a processing procedure of the learning device 51 included in the controller 12 of the third embodiment. With reference to the flowchart of FIG. 9, a reinforcement learning method that updates the action-value function Q (s, a) will be described.

In step S11, the learning device 51 acquires the operating information and the position command by the data acquisition unit 61. That is, the learning device 51 acquires the training data. The data acquisition unit 61 outputs the data set obtained by putting together the training data to the model generation unit 62.

In step S12, the learning device 51 calculates the reward by the reward calculation unit 63. The reward calculation unit 63 calculates the reward for a combination of the operating information for each of the carriers 16 and the position command for each of the carriers 16. The reward calculation unit 63 increases or decreases the reward on the basis of the number of the transfer path units 11 that execute the switching for each control cycle.

In step S13, the learning device 51 updates the action-value function by the function update unit 64. The function update unit 64 updates the action-value function Q (s, a) on the basis of the reward calculated in step S12. The learning device 51 updates the action-value function Q ($s_t$, $a_t$) stored in the trained model storage unit 52.

In step S14, the learning device 51 determines, by the function update unit 64, whether or not the action-value function Q (s, a) has converged. The function update unit 64 determines that the action-value function Q (s, a) has converged when the action-value function Q (s, a) is no longer updated in step S13.

If determining that the action-value function Q (s, a) has not converged (No in step S14), the learning device 51 returns to step S11 of the procedure. On the other hand, if determining that the action-value function Q (s, a) has converged (Yes in step S14), the learning device 51 ends the processing according to the procedure illustrated in FIG. 9. Note that the learning device 51 may continue learning by returning from step S13 to step S11 of the procedure without making the determination in step S14. The trained model storage unit 52 stores the trained model that is the action-value function Q (s, a) generated.

The third embodiment has described the case where reinforcement learning is applied as the learning algorithm used by the learning device 51, but learning other than reinforcement learning may be applied as the learning algorithm. The learning device 51 may execute machine learning using a known learning algorithm other than reinforcement learning such as deep learning, neural network, genetic programming, inductive logic programming, or support vector machine.

The learning device 51 illustrated in FIG. 7 and FIG. 8 is a device built in the controller 12. The learning device 51 may be a device external to the controller 12. The learning device 51 as the device external to the controller 12 is included in the transfer system 2. The learning device 51 may be a device connectable to the controller 12 via a network. The learning device 51 may be a device on a cloud server.

The learning device 51 may learn the position command for reducing the number of the transfer path units 11 that execute the switching in accordance with the data set created for a plurality of the transfer systems 2. The learning device 51 may acquire the training data from a plurality of the transfer systems 2 used in the same place, or may acquire the training data from a plurality of the transfer systems 2 used in different places. The training data may be collected from a plurality of the transfer systems 2 operating independently of each other in a plurality of places. After the training data starts to be collected from the plurality of the transfer systems 2, a new unit of the transfer system 2 may be added to the target from which the training data is collected. Also, after the training data starts to be collected from the plurality of the transfer systems 2, a part of the plurality of the transfer systems 2 may be excluded from the target from which the training data is collected.

The learning device 51 that has performed learning for one of the transfer systems 2 may perform learning for a different one of the transfer systems 2. The learning device 51 that performs learning for the different one of the transfer systems 2 can update the trained model by performing relearning for the different one of the transfer systems 2.

Figure 10:
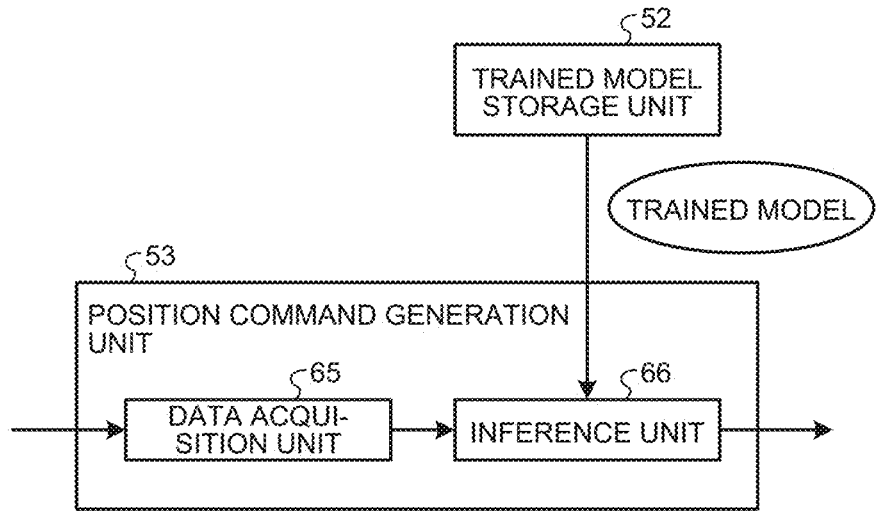
FIG. 10 is a diagram illustrating an exemplary configuration of a position command generation unit included in the controller of the third embodiment.

FIG. 10 is a diagram illustrating an exemplary configuration of the position command generation unit 53 included in the controller 12 of the third embodiment. The position command generation unit 53 includes a function as an inference device that infers the position command from the operating information. The position command generation unit 53 includes a data acquisition unit 65 and an inference unit 66.

The data acquisition unit 65 acquires inference data. The inference data is the operating information for each of the plurality of the carriers 16 included in the transfer system 2. The inference unit 66 reads the trained model generated by the learning device 51 from the trained model storage unit 52. The inference unit 66 infers the position command by inputting the inference data to the trained model. The inference unit 66 outputs the position command as an inference result to the coil drive command generation unit 54. The coil drive command generation unit 54 generates the coil drive command on the basis of the position command.

Figure 11:
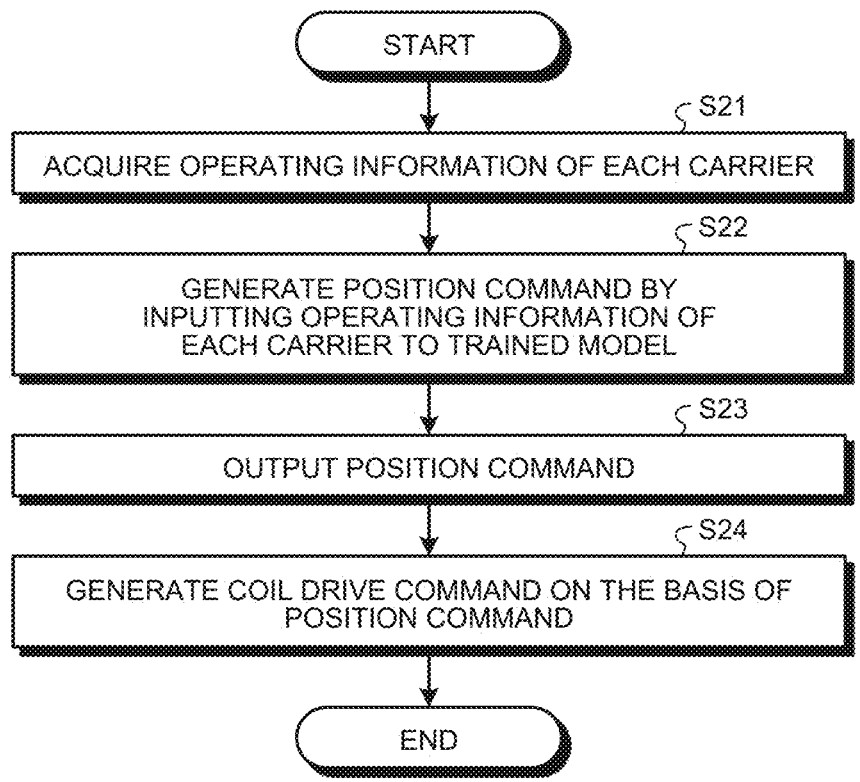
FIG. 11 is a flowchart illustrating a processing procedure of the position command generation unit and a coil drive command generation unit included in the controller of the third embodiment.

FIG. 11 is a flowchart illustrating a processing procedure of the position command generation unit 53 and the coil drive command generation unit 54 included in the controller 12 of the third embodiment.

In step S21, the position command generation unit 53 acquires the operating information of each of the carriers 16 by the data acquisition unit 65. The data acquisition unit 65 outputs the acquired operating information to the inference unit 66.

In step S22, the position command generation unit 53 generates the position command by inputting the operating information of each of the carriers 16 to the trained model in the inference unit 66. In step S23, the inference unit 66 outputs the position command to the coil drive command generation unit 54. In step S24, the coil drive command generation unit 54 generates the coil drive command on the basis of the position command. The position command generation unit 53 and the coil drive command generation unit 54 thus end the processing according to the procedure illustrated in FIG. 11. The controller 12 transmits the coil drive command generated by the coil drive command generation unit 54 to each of the transfer path units 11 via the data communication line 14.

According to the third embodiment, the transfer system 2 includes the learning device 51 and the position command generation unit 53 as the inference device, thereby being able to derive the position command for reducing the number of the transfer path units 11 that execute the switching. As a result, the transfer system 2 can reduce the noise and the energy loss.

The description has been made of the example in which the transfer system 2 according to the second embodiment applies learning to the generation of the position command. The learning described in the third embodiment may be applied to the generation of the position command in the case of stopping the switching of the transfer path unit 11 in which the carrier 16 is absent, as in the first embodiment. The transfer system 2 may generate the position command by a method other than the learning.

Next, hardware for implementing the controller 12 according to the first to third embodiments will be described. The controller 12 is implemented by processing circuitry. The processing circuitry may be circuitry in which a processor executes software, or may be dedicated circuitry.

Figure 12:
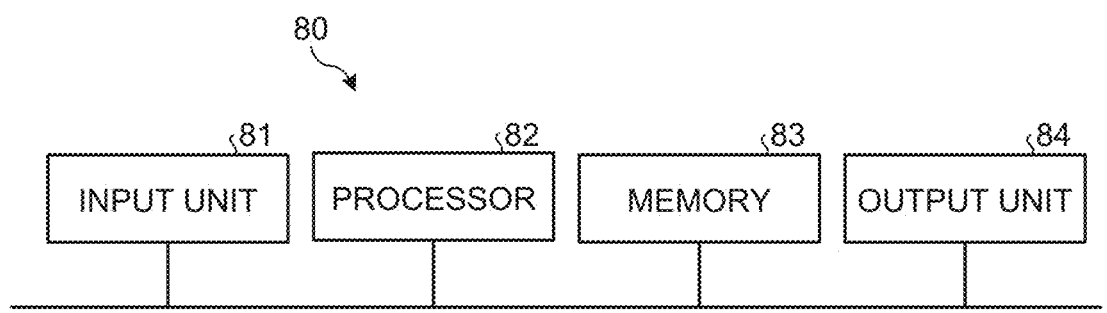
FIG. 12 is a diagram illustrating an exemplary configuration of a control circuit according to the first to third embodiments.

In the case where the processing circuitry is implemented by the software, the processing circuitry is, for example, a control circuit illustrated in FIG. 12. FIG. 12 is a diagram illustrating an exemplary configuration of a control circuit 80 according to the first to third embodiments. The control circuit 80 includes an input unit 81, a processor 82, a memory 83, and an output unit 84. The input unit 81 is an interface circuit that receives data input from the outside of the control circuit 80 and gives the data to the processor 82. The output unit 84 is an interface circuit that sends data from the processor 82 or the memory 83 to the outside of the control circuit 80.

In the case where the processing circuitry is the control circuit 80 illustrated in FIG. 12, the controller 12 is implemented by software, firmware, or a combination of software and firmware. The software or firmware is described as programs and stored in the memory 83. The processing circuitry implements the functions of the controller 12 by the processor 82 reading and executing the programs stored in the memory 83. That is, the processing circuitry includes the memory 83 for storing the programs that result in the execution of the processing of the controller 12. It can also be said that these programs cause a computer to execute the procedure and method related to the controller 12.

The processor 82 is a central processing unit (CPU), which is also referred to as a central processor, a processing unit, an arithmetic unit, a microprocessor, a microcomputer, a processor, or a digital signal processor (DSP). The memory 83 corresponds to, for example, a non-volatile or volatile semiconductor memory such as a random access memory (RAM), a read only memory (ROM), a flash memory, an erasable programmable read only memory (EPROM), or an electrically erasable programmable read only memory (EEPROM (registered trademark)), a magnetic disk, a flexible disk, an optical disk, a compact disc, a mini disc, a digital versatile disc (DVD), or the like.

Figure 13:
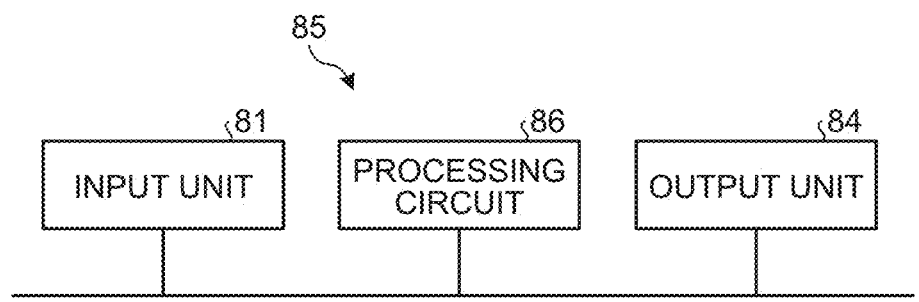
FIG. 13 is a diagram illustrating an exemplary configuration of a hardware circuit that is dedicated according to the first to third embodiments.

FIG. 12 is the example of the hardware in the case where the controller 12 is implemented by the processor 82 and the memory 83 that are for general purpose use, but the controller 12 may be implemented by a hardware circuit that is dedicated. FIG. 13 is a diagram illustrating an exemplary configuration of a hardware circuit 85 that is dedicated according to the first to third embodiments.

The hardware circuit 85 that is dedicated includes the input unit 81, the output unit 84, and a processing circuit 86. The processing circuit 86 is a single circuit, a complex circuit, a programmed processor, a parallel-programmed processor, an application specific integrated circuit (ASIC), a field programmable gate array (FPGA), or a circuit obtained by combining these. The functions of the controller 12 may be implemented individually or collectively by the processing circuit 86. Note that the controller 12 may be implemented by a combination of the control circuit 80 and the hardware circuit 85.

The configurations illustrated in the above embodiments each illustrate an example of the content of the present disclosure. The configurations of the embodiments can be combined with another known technique. The configurations of the embodiments may be combined together as appropriate. A part of the configurations of the embodiments can be omitted or modified without departing from the scope of the present disclosure.

REFERENCE SIGNS LIST 1, 2 transfer system; 10 transfer path; 11, 11A, 11B, 11C, 11D, 11E, 11F, 11G, 11H transfer path unit; 12 controller; 13 DC power supply; 14 data communication line; 15 DC power supply bus; 16, 16A, 16B, 16C carrier; 17A, 17B, 48 arrow; 20 coil; 21 inverter circuit; 22 current sensor; 23 capacitor; 24 current controller; 25 linear scale; 26 position sensor; 27, 82 processor; 28 communication slave station; 30, 31 permanent magnet; 40A, 40B, 40C, 40D switching element; 41A, 41B, 41C, 41D insulated gate driver; 42A, 42B bootstrap circuit; 44 secondary power supply; 45 positive terminal wiring; 46 negative terminal wiring; 47 signal line; 51 learning device; 52 trained model storage unit; 53 position command generation unit; 54 coil drive command generation unit; 61, 65 data acquisition unit; 62 model generation unit; 63 reward calculation unit; 64 function update unit; 66 inference unit; 80 control circuit; 81 input unit; 83 memory; 84 output unit; 85 hardware circuit; 86 processing circuitry.

The invention claimed is:

1. A transfer system comprising
a plurality of transfer path units that form a transfer path, on which a transferring body moves, to cause the transferring body to move by giving power to the transferring body; and
control circuitry configured to control each of the plurality of the transfer path units, wherein
each of the plurality of the transfer path units includes:
  a drive unit to generate the power; and
  an inverter circuit that includes a switching element to supply, to the drive unit, electric power obtained through electric power conversion by switching of the switching element, and
the circuitry is configured to control at least one of the transfer path units in a portion of the transfer path where the transferring body is absent to stop the switching in the inverter circuit.

2. The transfer system according to claim 1, further comprising one or a plurality of the transferring body, wherein
the drive unit includes a coil to generate electromagnetic force as the power by the electric power supplied from the inverter circuit, and
the transferring body is provided with a permanent magnet.

3. The transfer system according to claim 2, wherein
the transfer path is provided with a detector to detect a position of the transferring body, and
the circuitry is configured to stop the switching in the inverter circuit of the at least one of the transfer path units from among the transfer path units based on a detection result of the detector.

4. The transfer system according to claim 2,
wherein the control circuitry is configured to determine, on the basis of position information indicating a position of the transferring body in the transfer path, at least one of the transfer path units that is to execute the switching in the inverter circuitry and the at least one of the transfer path units that is to stop the switching in the inverter circuit.

5. The transfer system according to claim 4, wherein the control circuitry is configured to:
determine a first transfer path unit and a second transfer path unit as the at least one of the transfer path units that is to execute the switching,
  the first transfer path unit being a transfer path unit of the transfer path units in which the transferring body is present, and
  the second transfer path unit being at least one of:
    one or more of the transfer path units located adjacent to the first transfer path unit in front of the first transfer path unit in a direction of travel of the transferring body on the transfer path; or
    one or more of the transfer path units located adjacent to the first transfer path unit behind the first transfer path unit in the direction of travel, and
determine a transfer path unit of the transfer path units other than the first transfer path unit and the second transfer path unit among the transfer path units as the at least one of the transfer path units that is to stop the switching.

6. The transfer system according to claim 5, wherein at least either a number of the second transfer path units located adjacent to the first transfer path unit in front of the first transfer path unit in the direction of travel or a number of the second transfer path units located adjacent to the first transfer path unit behind the first transfer path unit in the direction of travel is calculated on the basis of a speed of the transferring body on the transfer path.

7. The transfer system according to claim 2, further comprising a learning device including:
data acquisition circuitry configured to acquire training data including operating information and a position command, the operating information being information indicating a schedule of movement of each of a plurality of the transferring body on the transfer path, the position command indicating a position to which the transferring body moves for each of the plurality of the transferring body; and
model generation circuitry configured to generate, on the basis of the training data, a trained model to be used for inference of the position command from the operating information.

8. The transfer system according to claim 2, wherein
the control circuitry includes position command generation circuitry to generate a position command indicating a position to which the transferring body moves for each of a plurality of the transferring body, and
the position command generation circuitry includes:
data acquisition circuitry configured to acquire operating information that is information indicating a schedule of movement of each of the plurality of the transferring bodies on the transfer path; and
inference circuitry to infer the position command by inputting the operating information to a trained model that infers, from the operating information, the position command indicating the position to which the transferring body moves for each of the plurality of the transferring bodies.

9. The transfer system according to claim 2, wherein
the switching element includes an upper arm that is a switching element connected between a positive terminal of a power supply connected to the inverter circuit and the drive unit and a lower arm that is a switching element connected between a negative terminal of the power supply and the drive unit, and
the circuitry is configured to:
control the upper arm to be in an open state during a period in which the switching in the inverter circuit is stopped, and
control the lower arm to be in an energized state during the period in which the switching in the inverter circuit is stopped.

10. The transfer system according to claim 9, wherein the inverter circuit includes:
a switching driver circuit configured to drive the upper arm; and
a bootstrap power supply circuit configured to drive the switching driver circuit.

11. The transfer system according to claim 1, wherein
the transfer path is provided with a detector to detect a position of the transferring body, and the circuitry is configured to stop the switching in the inverter circuit of the at least one of the transfer path units from among the transfer path units based on a detection result of the detector.

12. The transfer system according to claim 1, wherein the control circuitry is configured to determine, on the basis of position information indicating a position of the transferring body in the transfer path, at least one of the transfer path units that is to execute the switching in the inverter circuitry and the at least one of the transfer path units that is to stop the switching in the inverter circuit.

13. The transfer system according to claim 12, wherein the control circuitry is configured to:
determine a first transfer path unit and a second transfer path unit as the at least one of the transfer path units that is to execute the switching,
the first transfer path unit being a transfer path unit of the transfer path units in which the transferring body is present, and
the second transfer path unit being at least one of:
one or more of the transfer path units located adjacent to the first transfer path unit in front of the first transfer path unit in a direction of travel of the transferring body on the transfer path; or
one or more of the transfer path units located adjacent to the first transfer path unit behind the first transfer path unit in the direction of travel, and
determine a transfer path unit of the transfer path units other than the first transfer path unit and the second transfer path unit among the transfer path units as the at least one of the transfer path units that is to stop the switching.

14. The transfer system according to claim 13, wherein at least either a number of the second transfer path units located adjacent to the first transfer path unit in front of the first transfer path unit in the direction of travel or a number of the second transfer path units located adjacent to the first transfer path unit behind the first transfer path unit in the direction of travel is calculated on the basis of a speed of the transferring body on the transfer path.

15. The transfer system according to claim 1, further comprising a learning device including:
data acquisition circuitry configured to acquire training data including operating information and a position command, the operating information being information indicating a schedule of movement of each of a plurality of the transferring body on the transfer path, the position command indicating a position to which the transferring body moves for each of the plurality of the transferring body; and
model generation circuitry configured to generate, on the basis of the training data, a trained model to be used for inference of the position command from the operating information.

16. The transfer system according to claim 1, wherein the control circuitry includes position command generation circuitry to generate a position command indicating a position to which the transferring body moves for each of a plurality of the transferring body, and
the position command generation circuitry includes:
data acquisition circuitry configured to acquire operating information that is information indicating a schedule of movement of each of the plurality of the transferring bodies on the transfer path; and
inference circuitry to infer the position command by inputting the operating information to a trained model that infers, from the operating information, the position command indicating the position to which the transferring body moves for each of the plurality of the transferring bodies.

17. The transfer system according to claim 1, wherein the switching element includes an upper arm that is a switching element connected between a positive terminal of a power supply connected to the inverter circuit and the drive unit and a lower arm that is a switching element connected between a negative terminal of the power supply and the drive unit, and
the circuitry is configured to:
control the upper arm to be in an open state during a period in which the switching in the inverter circuit is stopped, and
control the lower arm to be in an energized state during the period in which the switching in the inverter circuit is stopped.

18. The transfer system according to claim 17, wherein the inverter circuit includes:
a switching driver circuit configured to drive the upper arm; and
a bootstrap power supply circuit configured to drive the switching driver circuit.

\* \* \* \* \*